United States Patent
Smit-Kingma et al.

(10) Patent No.: US 9,119,405 B2
(45) Date of Patent: Sep. 1, 2015

(54) WATER-IN-OIL EMULSION COMPRISING OMEGA-3 FATTY ACIDS AND PROCESS FOR THE MANUFACTURE OF SAME

(75) Inventors: Irene Erica Smit-Kingma, Vlaardingen (NL); Robert Marinus Verseput, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/994,904

(22) PCT Filed: Nov. 28, 2011

(86) PCT No.: PCT/EP2011/071168
§ 371 (c)(1), (2), (4) Date: Jun. 17, 2013

(87) PCT Pub. No.: WO2012/084416
PCT Pub. Date: Jun. 28, 2012

(65) Prior Publication Data
US 2013/0266704 A1    Oct. 10, 2013

(30) Foreign Application Priority Data

Dec. 22, 2010 (EP) .................................... 10196444

(51) Int. Cl.
| | | |
|---|---|---|
| A23D 7/005 | (2006.01) | |
| A23D 7/04 | (2006.01) | |
| A23D 7/00 | (2006.01) | |
| A23D 7/01 | (2006.01) | |

(52) U.S. Cl.
CPC ............... *A23D 7/005* (2013.01); *A23D 7/001* (2013.01); *A23D 7/013* (2013.01)

(58) Field of Classification Search
None
See application file for complete search history.

(56) References Cited

U.S. PATENT DOCUMENTS

| 4,234,577 A | 11/1980 | Zilliken | |
|---|---|---|---|
| 5,866,192 A * | 2/1999 | Uesugi et al. ................. | 426/634 |
| 2005/0271791 A1* | 12/2005 | Wright et al. ................. | 426/611 |
| 2007/0054028 A1 | 3/2007 | Perlman et al. | |
| 2007/0254088 A1* | 11/2007 | Stewart et al. ................ | 426/611 |
| 2008/0274175 A1* | 11/2008 | Schramm et al. ............. | 424/456 |
| 2010/0040737 A1* | 2/2010 | Radlo et al. ................... | 426/72 |
| 2010/0159079 A1 | 6/2010 | Qvyjt | |
| 2011/0287156 A1* | 11/2011 | Perlman ........................ | 426/560 |

FOREIGN PATENT DOCUMENTS

| EP | 1180545 A1 | 2/2002 |
|---|---|---|
| WO | WO0166560 A2 | 9/2001 |
| WO | WO2005/074726 | 8/2005 |
| WO | WO2006/134152 | 12/2006 |
| WO | WO2009068651 A1 | 6/2009 |
| WO | WO2010/069746 | 6/2010 |
| WO | WO2010069747 A1 | 6/2010 |

OTHER PUBLICATIONS

Lowe, Belle. 1955. Experimental Cookery, $4^{th}$ edition. John Wiley & Sons, Inc., New York. p. 270-273.*
Hui, Y. H. 1996. Bailey's Industrial OIl and Fat Products, vol. 1. $5^{th}$ edition. John Wiley & Sons, Inc., New York. p. 484-485.*
Micaleff et al, Beyond blood lipids phytosterols statins and omega-3 polyunsaturated fatty acid therapy for hyperlipidemia, Journal of Nutrional Biochemistry, 2009, 927-939, 20.
European Search Report for Application No. EP10196444 dated May 25, 2011.
PCT International Search Report and Written Opinion for International Application No. PCT/EP2011/071168 completed Jan. 26, 2012.
IPRP2 in PCTEP2011071168, Sep. 5, 2012.
Van Den Enden, A method for the determination of the solid phase content of fats using pulse nuclear magnetic resonance, Fette Seifen Anstrichmittel, 1978, pp. 180-186, vol. 80.
Written Opinion in EP10196444, May 25, 2011, EP.

* cited by examiner

*Primary Examiner* — Carolyn Paden
(74) *Attorney, Agent, or Firm* — Gerard J. McGowan, Jr.

(57) ABSTRACT

The present invention relates to a water-in-oil emulsion comprising 15-90 wt. % of a fat phase having a solid fat content at 20° C. ($N_{20}$) of at least 10%; and 10-85 wt. % of aqueous phase, said fat phase comprising: •60-85% by weight of the fat phase of glycerides selected from triglycerides, diglycerides, monoglycerides, phospholipids and combinations thereof, including at least 70% of triglycerides by weight of said glycerides •15-40% by weight of said fat phase of phytosterol esters selected from sterol esters, stanol esters and combinations thereof; wherein ω-3 fatty acids selected from EPA, DHA and combinations thereof represent 4-70% by weight of the fatty acids contained in the emulsion. Despite the high levels of EPA and DHA contained in the emulsion, off-flavor development as a result of oxidation of these ω3-fatty acids is minimized due to the presence of sterol esters.

18 Claims, No Drawings

WATER-IN-OIL EMULSION COMPRISING OMEGA-3 FATTY ACIDS AND PROCESS FOR THE MANUFACTURE OF SAME

TECHNICAL FIELD OF THE INVENTION

The present invention relates to water-in-oil emulsions comprising ω-3 fatty acids selected from eicosapentaenoic acid (EPA), docosahexaenoic acid (DHA) and combinations thereof. The emulsions according to the present invention additionally comprise phytosterol esters selected from sterol esters, stanol esters and combinations thereof. Examples of water-in-oil emulsions according to the present invention include spreads, kitchen margarines and bakery margarines.

The present invention also provides a process for the manufacture of such emulsions.

BACKGROUND OF THE INVENTION

Many scientific publications strongly suggest that regular consumption of significant amounts of polyunsaturated fatty acids can deliver important health benefits. In recent years, ω-3 polyunsaturated fatty acids, especially the ω-3 fatty acids eicosapentaenoic acid (EPA) and docosahexaenoic acid (DHA), have become more important.

DHA is a carboxylic acid with a 22-carbon chain and six cis double bonds; the first double bond is located at the third carbon from the omega end. Its trivial name is cervonic acid, its systematic name is (4Z,7Z,10Z,13Z,16Z,19Z)-docosa-4,7,10,13,16,19-hexaenoic acid, and its shorthand name is 22:6 (n-3) in the nomenclature of fatty acids.

Cold-water oceanic fish oils are rich in DHA. Most of the DHA in fish and complex organisms with access to cold-water oceanic foods originates in photosynthetic and heterotrophic microalgae, and becomes increasingly concentrated in organisms, as they move up the food chain. DHA is also commercially manufactured from microalgae, such as *Crypthecodinium cohnii*. Some animals with access to seafood make very little DHA through metabolism, but obtain it in the diet. However, in strict herbivores, and carnivores that do not eat seafood, DHA is manufactured internally from α-linolenic acid, a shorter omega-3 fatty acid manufactured by plants (and also occurring in animal products as obtained from plants).

DHA is metabolized to form the docosanoids, which comprise several families of potent hormones. DHA is a major fatty acid in sperm and brain phospholipids, particularly in the retina. Dietary DHA may reduce the risk of heart disease by reducing the level of blood triglycerides in humans.

EPA is a carboxylic acid with a 20-carbon chain and five cis double bonds; the first double bond is located at the third carbon from the omega end. Its trivial name is timnodonic acid, its systematic name is (5Z,8Z,11Z,14Z,17Z)-eicosa-5,8,11,14,17-pentenoic acid, and its shorthand name is 20:5(n-3) in the nomenclature of fatty acids.

EPA and its metabolites act in the body largely by their interactions with the metabolites of arachidonic acid. EPA acts as a precursor for prostaglandin-3 (which inhibits platelet aggregation), thromboxane-3, and leukotriene-5 groups (all eicosanoids).

Like DHA, EPA is obtained in the human diet by eating oily fish or fish oil, e.g., cod liver, herring, mackerel, salmon, menhaden and sardine. It is also found in human breast milk. Fish do not naturally produce EPA, but obtain it, as with DHA, from the algae they consume.

The human body can convert α-linolenic acid to EPA, but this is much less efficient than resorption of EPA from food containing it. Because EPA is also a precursor to DHA, ensuring a sufficient level of EPA in a diet containing neither EPA nor DHA is harder both because of the extra metabolic work required to synthesize EPA and because of the use of EPA to metabolize DHA. Medical conditions like diabetes or certain allergies may significantly limit the human body's capacity for metabolization of EPA from α-linolenic acid.

The US National Institute of Health's MedlinePlus lists medical conditions for which EPA (alone or in concert with other ω-3 sources) is known or thought to be an effective treatment. Most of these involve its ability to lower inflammation.

Among omega-3 fatty acids, in particular EPA is thought to possess beneficial potential in mental conditions, such as schizophrenia. Several studies report an additional reduction in scores on symptom scales used to assess the severity of symptoms, when additional EPA is taken.

Many efforts have been made by the industry to develop food products and nutritional preparations that contain appreciable amounts of EPA and/or DHA. However, edible products containing appreciable levels of EPA and/or DHA tend to develop an off-flavour during storage. This off-flavour problem is associated with the oxidation of EPA and DHA. Oxidation of these particular polyunsaturated fatty acids is accompanied by the formation of volatile, potent flavour molecules, such as unsaturated aldehydes. Flavour attributes associated with the oxidation products of EPA and DHA include "cardboard", "paint", "oily", "rancid", "grass", "metallic" and "fish". These off-flavour notes are particularly objectionable in food products such as spreads.

It is generally assumed that food products should contain relatively high levels of EPA and DHA to have the desired beneficial health effects like reduced platelet aggregation and reduced blood triglycerides. However, efforts in the industry to employ high levels EPA and DHA in food products have been frustrated by the tendency of these products to quickly develop an off-flavour during storage.

Water-and-oil emulsions containing appreciable levels of EPA and DHA are particularly sensitive to off-flavour development, presumably because oxygen contained in the water phase can react with the EPA and DHA at the oil-water interface and/or because the oxidation of EPA and DHA is catalyzed by components contained in the aqueous phase, such as traces of copper or iron. In water-in-oil emulsions such as spreads, off-flavour formation as a result of oxidation of EPA and DHA is a particularly challenging problem as spreads have a rather bland taste and are usually consumed over a period of weeks during which time the product is in direct contact with atmospheric oxygen.

EP-A 1 180 545 describes plant sterol-containing fat compositions comprising a plant sterol fatty acid ester and a partial glyceride. The Examples describe the preparation of a margarine comprising 54 wt. % of an aqueous phase, 27.6% by weight of a hardened fish oil (melting point: 36° C.) and 18.4% by weight of a plant sterol containing composition (containing 49 wt. % plant sterol fatty acid ester).

US 2007/0054028 relates to the use of non-esterified phytosterols in formulating fat-containing dietary supplements and direct food additives, and in fortifying prepared foods. It is observed in the US patent application that non-esterified phytosterols were found to have the property of decreasing the oxidation of fats used in these supplements and prepared foods, particularly the oxidation of triglycerides containing polyunsaturated fatty acids including linoleic and alpha-linolenic acid and also the more perishable fatty acids found in fish oil, e.g. DHA and EPA.

WO 2009/068651 describes oil-in-water emulsions suitable for direct human consumption, comprising a triglyceride oil having a solid fat content in the range of ambient to body temperature, galactolipid, and a sterol of vegetable origin selected from a phytosterol, a phytostanol, an ester of a phytosterol, an ester of a phytostanol and their mixtures.

Micallef et al. ("Beyond blood lipids: phytosterols, statins and omega-3 polyunsaturated fatty acid therapy for hyperlipidemia", Journal of Nutritional Biochemistry 20 (2009, 927-939) observe that phytosterols and omega-3 fatty acids are natural compounds with potential cardiovascular benefits. The authors conclude that it would be desirable to develop a single functional food incorporating phytosterols and omega-3 fatty acids for ease of consumption and improved compliance.

SUMMARY OF THE INVENTION

The inventors have found a way to effectively reduce the rate at which EPA and DHA are oxidized in water-in-oil emulsions having a high content of these ω-3 fatty acids. More specifically, the inventors have discovered that phytosterol esters, i.e. sterol esters and/or stanol esters, are capable of preventing the oxidation of EPA and DHA if applied in high concentrations.

Thus, one aspect of the invention provides a water-in-oil emulsion comprising 15-90 wt. % of a fat phase having a solid fat content at 20° C. ($N_{20}$) of at least 10%; and 10-85 wt. % of aqueous phase, said fat phase comprising:
  60-85% by weight of the fat phase of glycerides selected from triglycerides, diglycerides, monoglycerides, phospholipids and combinations thereof, including at least 70% of triglycerides by weight of said glycerides
  15-40% by weight of said fat phase of phytosterol esters selected from sterol esters, stanol esters and combinations thereof;
  wherein ω-3 fatty acids selected from EPA, DHA and combinations thereof represent 4-70% by weight of the fatty acids contained in the emulsion.

Although the inventors do not wish to be bound by theory, it is believed that the sterol esters accumulate at the oil-water interface of the emulsion and somehow prevent oxygen comprised in the dispersed aqueous phase from interacting with the EPA and DHA contained in the continuous oil phase and/or prevent catalytically active substances from participating in such oxidation reactions at the oil-water interface.

Another aspect of the invention relates to a water-in-oil emulsion as described above, said process comprising combining fish oil, hardstock fat, phytosterol esters, water and optionally additional food ingredients.

DETAILED DESCRIPTION OF THE INVENTION

Accordingly, one aspect of the invention relates to a water-in-oil emulsion comprising 15-90 wt. % of a fat phase having a solid fat content at 20° C. ($N_{20}$) of at least 10%; and 10-85 wt. % of aqueous phase, said fat phase comprising:
  60-85% by weight of the fat phase of glycerides selected from triglycerides, diglycerides, monoglycerides, phospholipids and combinations thereof, including at least 70% of triglycerides by weight of said glycerides
  15-40% by weight of said fat phase of phytosterol esters selected from sterol esters, stanol esters and combinations thereof;
  wherein ω-3 fatty acids selected from EPA, DHA and combinations thereof represent 4-70%, preferably 5-65%, even more preferably 6-60% and most preferably 6.5-25% by weight of the fatty acids contained in the emulsion.

The term "phytosterol" as used herein covers both plant sterols and plant stanols. Phytosterols are a special group of steroids. Steroids are generally represented by the following formula.

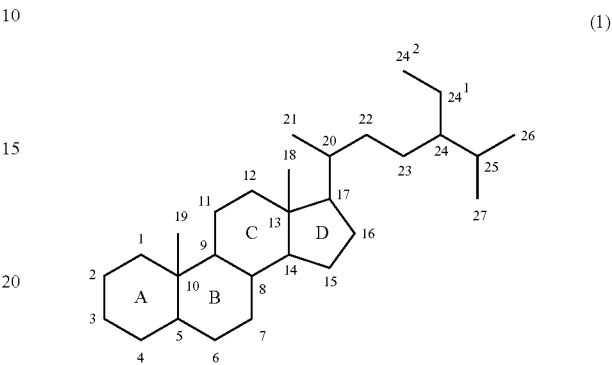

(1)

The term "sterol" refers to sterols produced in plants. These sterols carry a hydroxyl group at C-3 and are further characterized by alkylation of the C-17 side-chain with a methyl or ethyl substituent at the C-24 position. Major phytosterols include, but are not limited to, sitosterol, stigmasterol, campesterol, and brassicasterol.

The term "stanol" refers to a fully-saturated subgroup of phytosterols. Phytostanols occur in trace levels in many plant species. Phytosterols can be converted to phytostanols by chemical hydrogenation.

The term "phytosterol ester" refers to a fatty acid ester of phytosterol. Likewise, the terms "sterol ester" and "stanol ester" refers to a fatty acid ester of sterol or stanol, respectively.

Whenever reference is made herein to the melting point of a fat or a fat powder, said melting point is determined by ISO method 6321:2002 (Animal and vegetable fats and oils—Determination of melting point in open capillary tubes (slip point)).

According to a particularly preferred embodiment at least 80 wt. %, more preferably at least 90 wt. % of the EPA and/or DHA contained in the emulsion is comprised in glycerides, most preferably in triglycerides.

The inventors have found that oxidation of EPA and DHA can be prevented very effectively if the present emulsions contains high levels of phytosterol ester. Consequently, in accordance with a particularly preferred embodiment, the phytosterol esters represent at least 7 wt. %, preferably at least 9 wt. % of the emulsion. Typically, the phytosterol ester will be applied in the present emulsion in a concentration that does not exceed 30 wt. %, preferably does not exceed 20 wt. %.

The phytosterol ester is preferably contained in the present emulsion in a concentration that exceeds ⅓ of the ω-3 fatty acid content. Expressed differently, it is preferred that the phytosterol esters and the ω-3 fatty acids are contained in the emulsion in a weight ratio in excess of 1:3, more preferably in a weight ratio of 1:2 to 3:1.

Advantageously, at least 25 wt. % of the fatty acids contained in the phytosterol ester are unsaturated fatty acids. Even more preferably, at least 25 wt. % of the fatty acids contained in the phytosterol esters are polyunsaturated fatty acids.

It is further preferred to employ phystosterol esters having a low melting point, e.g. a melting point of less than 70° C., more preferably of less than 60° C., and most preferably of less than 50° C.

The fat phase of the present emulsion preferably contains a substantial amount of polyunsaturated $C_{18}$ fatty acids, e.g. 25-95% by weight of the fatty acids contained in the emulsion.

In accordance with a particularly preferred embodiment, marine oil represents at least 10%, more preferably at least 20% and most preferably at least 30% by weight of the glycerides comprised in the emulsion. Typically, the marine oil represents not more than 97% by weight of the glycerides. The marine oil is suitably selected from fish oil, algae oil and combinations thereof.

According to a particularly preferred embodiment, the marine oil is a non-hydrogenated (non-hardened) marine oil.

Besides the marine oil the emulsion preferably contains 3-20 wt. % of a hardstock fat. The hardstock fat typically has a melting point in excess of 45° C.

Typically, triglycerides and diglycerides together represent the bulk, e.g. more than 90 wt. % of the glycerides contained in the fat phase of the emulsion. Even more preferably, triglycerides represent at least 90 wt. % of the glycerides contained in the fat phase of the emulsion.

The fat phase of the present emulsion typically has a solid fat content at 20° C. ($N_{20}$) of 12-60%. The solid fat content at 35° C. ($N_{35}$) preferably does not exceed 10%, more preferably it does not exceed 6%.

The solid fat content of a fat at a given temperature of x° C. ($N_x$) can be determined by NMR pulse technique using the procedure described in Fette, Seifen, Anstrichmittel 80, (1978), 180-186.

The emulsion according to the present invention typically contains 0.1-10%, more preferably 0.5-8% by weight of triglycerides of trisaturated triglycerides having a melting point in excess of 25° C.

According to another preferred embodiment, the emulsion contains 18-64 wt. % of the fat phase and 36-82 wt. % of the aqueous phase.

The aqueous phase of the emulsion may suitably contain a variety of food grade ingredients, such as sodium chloride, acidulant, preservative, water-soluble flavouring, protein, polysaccharides, minerals, water-soluble vitamins etc. Sodium chloride is typically contained in the aqueous phase in a concentration of 0-2.0 wt. %.

The fat phase of the emulsion may suitably contain food ingredients such as anti-oxidants (e.g. tocopherols), colouring, oil-soluble vitamins, oil-soluble flavouring etc.

Another aspect of the invention elates to a process of manufacturing a water-in-oil emulsion as defined herein before, said process comprising combining marine oil, hardstock fat, phytosterol esters, water and optionally additional food ingredients.

The marine oil is suitably selected from fish oil, algae oil and combinations thereof. EPA and DHA taken together preferably represent 10-75% by weight of the fatty acids contained in the marine oil.

The EPA and/or DHA contained in the present emulsion is preferably at least partly provided by a marine oil, especially a marine oil selected from fish oil, algae oil and combinations thereof.

The marine oil is preferably employed in an amount representing at least 5% by weight of the final emulsion. Even more preferably, marine oil is employed in an amount of at least 10% and most preferably of at least 12% by weight of the final emulsion. Expressed differently, the marine oil is preferably employed in an amount representing at least 10%, more preferably 20-95% and most preferably 30-90% by weight of the glycerides comprised in the emulsion.

The present process preferably employs a pre-crystallized hardstock fat as this enables the preparation of the emulsion with minimum heat stress being applied. It is believed to be important to avoid exposing the marine oil to high temperatures as oxidation rates increase rapidly with temperature. According to a particularly preferred embodiment, the present process employs is a pre-crystallized fat and during manufacture of the emulsion said pre-crystallized fat is maintained at a temperature below the melting point of said pre-crystallized fat. Even more preferably, the pre-crystallized fat is maintained at a temperature that is at least 5° C., more preferably at least 10° C. below the melting point of said fat.

According to a particularly preferred embodiment the pre-crystallized hardstock employed in the present process is a microporous fat powder containing at least 50 wt. % of fat; having a bulk density of 10-200. g/l; a mass weighted average diameter of 10-400 μm, and a melting point of at least 30° C.

Typically, the hardstock fat is employed in an amount representing 3-20 wt. % of the glycerides comprised in the final emulsion.

Besides marine oil and hardstock fat other fat components, such as vegetable oils, dairy fats and animal fats, may be employed in the production of the emulsion. Preferably, vegetable oil is employed in an amount representing 0-80 wt. % of the glycerides contained in the final emulsion. Typically, vegetable oil and marine oil are employed in such amounts that together they represent at least 60%, more preferably at least 70% and most preferably at least 75% by weight of the glycerides contained in the emulsion.

The invention is further illustrated by means of the following non-limiting examples.

EXAMPLES

Example 1

Fat-continuous spreads (spread 1 and spread A) were produced by separately preparing a fat phase and an aqueous phase in accordance with the following recipes (in % by weight of final product—excluding citric acid).

| Fat phase | 1 | A |
|---|---|---|
| Fish oil containing 30% EPA + DHA | 22.00 | 22.00 |
| Sunflower oil | 2.31 | 7.31 |
| Interesterified mixture of 65% palm oil stearin (IV = 14) and 35% palm kernel oil # | 5.26 | 5.26 |
| Sterol esters (Generol ® NG Deso, Cognis) | 12.50 | |
| Saturated monoglycerides (Dimodan ® HP) | 0.15 | 0.15 |
| Unsaturated monoglycerides. (Dimodan ® RTB) | 0.15 | 0.15 |
| β-carotene | 0.06 | 0.06 |
| Tocopherol mixture | 0.07 | 0.07 |
| Flavouring | 0.01 | 0.01 |

Microporous fat powder produced by supercritical melt micronisation process as described in e.g. WO 2010/069746)

| Aqueous phase | | |
|---|---|---|
| Demineralised water | 56.24 | 63.74 |
| EDTA | 0.01 | 0.01 |
| Potassium sorbate | 0.1 | 0.1 |
| Buttermilk powder (sweet) | 0.15 | 0.15 |
| Sodium chloride | 1.00 | 1.00 |
| Citric acid (20%) to adjust pH to 4.7 | | |

Spread A differs from spread 1 in that sterol esters were replaced by sunflower oil and water. The amount of sunflower oil reflects the amount of fatty acid residues comprised in the sterol esters whereas the amount of water reflects the amount of sterol residue contained the sterol esters.

The aqueous phase having a temperature of about 12° C. was combined with the fat phase having a temperature of approximately 15° C. and mixed in a cooled stirred pin mixer (C-unit). The fat-continuous product exiting the mixer had a temperature of about 19° C.

Example 2

The spreads described in Example 1 were stored at 5° C. for up to 14 weeks. In case of the spread A, i.e. the spread containing no added sterol esters, off-flavour notes became noticeable after 5 weeks and after 9 weeks the product had developed a clearly perceptible fishy off-flavour. In spread 1 off-flavour notes were first detected after 9 weeks storage and fishy off-notes were detected for the first time after 12 weeks.

The invention claimed is:

1. A water-in-oil emulsion comprising 15-90 wt. % of a fat phase having a solid fat content at 20° C. ($N_{20}$) of at least 10%; and 10-85 wt. % of aqueous phase, said fat phase of the water-in-oil emulsion comprising:
60-85% by weight of the fat phase of glycerides selected from triglycerides, diglycerides, monoglycerides, phospholipids and combinations thereof, including at least 70% of triglycerides by weight of said glycerides
15-40% by weight of said fat phase of phytosterol esters selected from sterol esters, stanol esters and combinations thereof;
wherein ω-3 fatty acids selected from eicosapentaenoic acid (EPA), docosahexaenoic acid (DHA) and combinations thereof represent 4-70% by weight of the fatty acids contained in the water-in-oil emulsion.

2. Water-in-oil emulsion according to claim 1, wherein the phytosterol esters represent at least 7 wt %, of the emulsion.

3. The water-in-oil err according to claim 2, wherein the phytosterol esters represent at least 9 wt. % of the emulsion.

4. Water-in-oil emulsion according to claim 1, wherein the phytosterol esters and the ω-3 fatty acids are contained in the emulsion in a weight ratio in excess of 1:3.

5. Water-in-oil emulsion according to claim 4, wherein the phytosterol esters and the ω-3 fatty acids are contained in the emulsion in a weight ratio of 1:2 to 3:1.

6. Water-in-oil emulsion according to claim 4, wherein the phytosterol ester has a melting point of less than 70° C.

7. The water-in-oil emulsion according to claim 6 wherein the phytosterol ester has a melting point of less than 60° C.

8. Water-in-oil emulsion according to claim 4, wherein marine oil represents at least 20 wt. % of the glycerides, said marine oil being selected from fish oil, algae oil and combinations thereof.

9. The water-in-oil emulsion according to claim 8 wherein marine oil represents at least 30 wt. % of the glycerides.

10. Water-in-oil emulsion according to claim 4, wherein the fat phase has a solid fat content at 20° C. ($N_{20}$) of at least 10 wt. %.

11. Water-in-oil emulsion according to claim 4, wherein the emulsion contains 0.1-10% by weight of triglycerides of trisaturated triglycerides having a melting point in excess of 25° C.

12. Water-in-oil emulsion according to claim 4, wherein the emulsion contains 18-64 wt. % of the fat phase and 36-82 wt. % of the aqueous phase.

13. Water-in-oil emulsion according to claim 4, wherein the aqueous phase comprises 0-2.0 wt. % of sodium chloride.

14. A process of manufacturing a water-in-oil emulsion according to claim 4, said process comprising combining marine oil, hardstock fat, phytosterol esters, water and optionally additional food ingredients.

15. Process according to claim 14, wherein the marine oil is employed in amount representing at least 5% by weight of the final emulsion.

16. Process according to claim 14, wherein the hardstock fat employed is a pre-crystallized fat and wherein during manufacture of the emulsion said pre-crystallized fat is maintained at a temperature below the melting point of said pre-crystallized fat.

17. Process according to claim 14, wherein the hardstock fat is employed in an amount representing 3-20 wt. % of the glycerides comprised in the final emulsion.

18. A process of manufacturing a water-in-oil emulsion comprising 15-90 wt. % of a fat phase having a solid fat content at 20° C. ($N_{20}$) of at least 10%; and 10-85 wt. % of aqueous phase, said fat phase comprising:
60-85% by weight of the fat phase of glycerides selected from triglycerides, diglycerides, monoglycerides, phospholipids and combinations thereof, including at least 70% of triglycerides by weight of said glycerides
15-40% by weight of said fat phase of phytosterol esters selected from sterol esters, stanol esters and combinations thereof; wherein ω-3 fatty acids selected from eicosapentaenoic acid (EPA), docosahexaenoic acid (DHA) and combinations thereof represent 4-70% by weight of the fatty acids contained in the water-in-oil emulsion, wherein the phytosterol esters and the ω-3 fatty acids are contained in the emulsion in a weight ratio in excess of 1:3, the process comprising combining marine oil, hardstock fat, phytosterol esters, water and optionally additional food ingredients, wherein the hardstock fat is a microporous fat powder containing at least 50 wt. % of fat; having a bulk density of 10-200 g/l; a mass weighted average diameter of 10-400 μm; and a melting point of at least 30° C.

* * * * *